2 Sheets—Sheet 2.

J. W. WOOD.
TROTTING SULKY.

No. 187,693. Patented Feb. 20, 1877.

Witnesses.
Franck L. Ourand
P. McNickle

Inventor
John W. Wood
per. L. Deane
Attorney.

UNITED STATES PATENT OFFICE.

JOHN W. WOOD, OF OWATONNA, MINNESOTA, ASSIGNOR OF ONE-HALF HIS RIGHT TO CHARLES SCHOEN, OF SAME PLACE.

IMPROVEMENT IN TROTTING-SULKIES.

Specification forming part of Letters Patent No. 187,693, dated February 20, 1877; application filed December 9, 1876.

*To all whom it may concern:*

Figure 1:
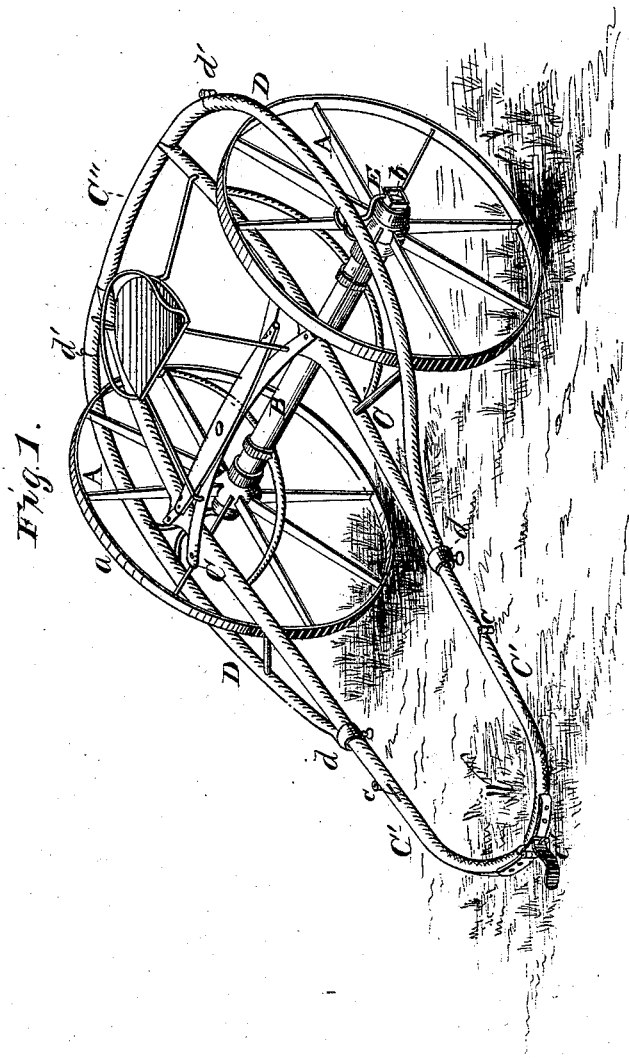
Figure 2:
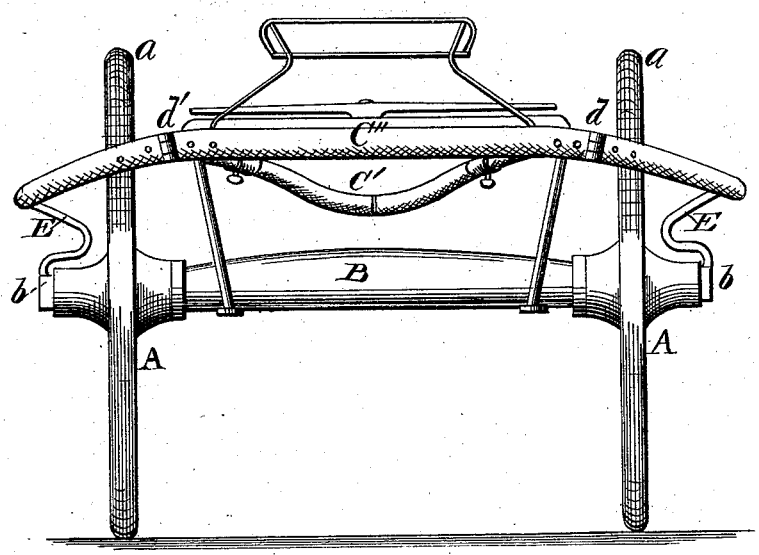
Figure 3:
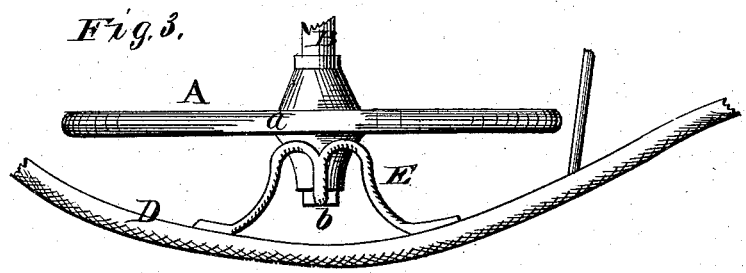

Be it known that I, JOHN W. WOOD, of Owatonna, in the county of Steele and State of Minnesota, have invented certain new and useful Improvements in Trotting-Sulkies, of which the following is a specification:

Figure 1 is a perspective. Fig. 2 is a rear elevation. Fig. 3 is a plan view, showing one wheel, and the fender outside of it.

The object of the present invention is to provide a trotting-sulky that shall embody the following points: first, jointed ends or tips to the thills or shafts; second, a fender on each side and outside the wheels; third, a brace running from the nut on the axle to the fender; fourth, the general combination of the several parts, all as and for the purposes now in detail to be more fully explained.

In the accompanying drawings, A denotes the wheels, having a rounded or half-oval tire, $a$; B, the axle, and C the shafts or thills. To these are attached, at the front ends, the curved joints or tips C' by means of hinges $c$. At the point where said tips meet or approach each other are applied the shaft and buckle $c'$. Thus the shafts can be readily adapted about the horse, and securely held or easily detached when desired. Sometimes I provide a pin and socket at these ends of the thills to assist in holding them evenly in place.

The thills or shafts can be easily adapted, by means of telescope-joints, or by sleeves and set-screws, to the length of any sized horse.

The front ends of the fenders D on each side are attached at any convenient point on the shafts—now shown at sleeve and set-screw $d$, and thence extend back about and outside the wheels, and are hinged at $d'$ to the brace C'', which connects the rear ends of the shafts together. Attached in this way, or by any like means, the said fender can be easily applied or detached.

The brace E, extending from the fender to the nut $b$ on the axle, is so adapted that it will afford suitable support and strength to the fender, and at the same time effectually secure the nut from coming off.

Other than as above, my sulky is of any general construction now in use. As thus made, it is possessed of many and very important advantages.

By opening the hinged ends or tips of the shafts the horse can be readily put in or taken out. If a tug should become loose the shafts will give sufficient draft capacity, the lines will not catch in the ends of the shafts, nor will the ends of the shafts hitch into a passing vehicle or other object; nor will there be much chance for the sulky to tip over.

The fenders will protect the wheels from other wheels or any obstacle, and will help, materially, in stiffening the shafts. By reason of this strengthening help the shafts can be made considerably lighter than heretofore.

I prefer an oval tire on the wheels. These allow the wheels to slough sidewise if the fender comes against any object, and to easily shove aside any stone or similar obstacle on the track.

The means I have above explained for keeping the nut in place, whether it be done by the spring of the brace, or by adjustably fixing the end of said brace into a sleeve or pocket in the nut, or in whatever way done, is of especial importance.

Oftentimes, in the restless movements of the horse before starting in a race, the sulky is moved backward and forward so as to work the nut loose; and, again, when extra pains have been taken to make the nut fit tight on the axle, when the axle becomes heated, the wheel will cease to revolve, and become fast, and thus destroy the working of the vehicle.

Having thus described my invention, what I consider new, and desire to secure by Letters Patent, is—

1. The hinged ends C', combined with shafts or thills C, substantially as and for the purposes set forth.

2. The fender D, combined with shafts C, substantially in the manner and for the purposes set forth.

3. The combination of fender D, braces E, and nut $b$, substantially as and for the purposes set forth.

In testimony that I claim the foregoing as my own I affix my signature in presence of two witnesses.

JOHN W. WOOD.

Witnesses:
H. E. JOHNSON,
H. A. BEERS.